(12) United States Patent
Vestergaard Frandsen et al.

(10) Patent No.: US 11,541,980 B2
(45) Date of Patent: Jan. 3, 2023

(54) AIRSHIP CONSTRUCTION AND METHOD WHERE A HARNESS-STRUCTURE IS FASTENED AROUND A HULL

(71) Applicant: SCEYE SA, Zug (CH)

(72) Inventors: Mikkel Vestergaard Frandsen, New York, NY (US); Christian Dalsgaard, Viby J (DK); Anders Klitgaard, Hammel (DK)

(73) Assignee: SCEYE SA, Zug (CH)

( * ) Notice: Subject to any disclaimer, the term of this patent is extended or adjusted under 35 U.S.C. 154(b) by 592 days.

(21) Appl. No.: 16/344,127

(22) PCT Filed: Oct. 23, 2017

(86) PCT No.: PCT/EP2017/077008
§ 371 (c)(1),
(2) Date: Apr. 23, 2019

(87) PCT Pub. No.: WO2018/077805
PCT Pub. Date: May 3, 2018

(65) Prior Publication Data
US 2019/0329855 A1    Oct. 31, 2019

Related U.S. Application Data

(60) Provisional application No. 62/411,756, filed on Oct. 24, 2016.

(51) Int. Cl.
*B64B 1/14* (2006.01)
*B64B 1/30* (2006.01)
(Continued)

(52) U.S. Cl.
CPC .............. *B64B 1/14* (2013.01); *B64B 1/30* (2013.01); *B64D 27/24* (2013.01); *B64D 27/26* (2013.01);
(Continued)

(58) Field of Classification Search
CPC .... B64B 1/02; B64B 1/04; B64B 1/14; B64B 1/30; B64B 1/32; B64B 1/34
See application file for complete search history.

(56) References Cited

U.S. PATENT DOCUMENTS 6,224,016 B1    5/2001  Lee
7,147,184 B1 *  12/2006 Purvis, IV ............... B64B 1/04
                                                        244/24

(Continued)

FOREIGN PATENT DOCUMENTS

CN    102897330 A    1/2013
CN    204568048 U    8/2015
(Continued)

OTHER PUBLICATIONS

G.A.Khoury, "Airship Technology", (Cambridge University Press 1999 with the second edition of 2012).

(Continued)

*Primary Examiner* — Nicholas McFall
*Assistant Examiner* — Terri L Filosi
(74) *Attorney, Agent, or Firm* — Cermak Nakajima & McGowan LLP; James Creighton Wray

(57) ABSTRACT

A lighter than air airship (1) comprising a gas-filled flexible hull (2) which is elongate with a longitudinal axis (1') and with a front end (4) and a rear end (5), wherein a harness-structure (3) is abutting an outer side of the hull (2) and not perturbing the hull and not extending through the hull, the harness-structure (3) is made of a bendable material and carries a propeller engine (10) for forward thrust of the airship (1), rechargeable batteries (11) for providing electrical power to the propeller engine (10), and a solar panel for providing electrical power to recharge the batteries (11).

7 Claims, 6 Drawing Sheets

(51) Int. Cl.
　　　*B64D 27/24*　　　(2006.01)
　　　*B64D 27/26*　　　(2006.01)

(52) U.S. Cl.
　　　CPC .. *B64C 2201/022* (2013.01); *B64C 2201/122* (2013.01); *B64D 2211/00* (2013.01); *B64D 2221/00* (2013.01)

(56) References Cited

U.S. PATENT DOCUMENTS

| | | | |
|---|---|---|---|
| 7,303,166 | B2 | 12/2007 | Geery |
| 7,446,451 | B2 | 11/2008 | Allen |
| 8,020,805 | B2 | 9/2011 | Choi |
| 8,141,814 | B2 | 3/2012 | Kulesha |
| 8,152,093 | B2 | 4/2012 | Liggett |
| 2001/0002686 | A1* | 6/2001 | Yokomaku ............. B64B 1/02 244/30 |
| 2002/0005457 | A1 | 1/2002 | Lee |
| 2006/0192048 | A1 | 8/2006 | Pedretti |
| 2009/0272841 | A1 | 11/2009 | Sinsabaugh |
| 2009/0293950 | A1 | 12/2009 | Chabrecek |
| 2011/0247689 | A1 | 10/2011 | Chabrecek |
| 2014/0060643 | A1 | 3/2014 | Martin |
| 2014/0230882 | A1 | 8/2014 | Hingley |
| 2018/0022461 | A1* | 1/2018 | Nunes ................. B64B 1/34 244/26 |
| 2019/0217078 | A1* | 7/2019 | Yang .................... A61N 1/0496 |

FOREIGN PATENT DOCUMENTS

| | | |
|---|---|---|
| DE | 10251280 A1 | 5/2004 |
| DE | 10326688 A1 | 12/2004 |
| DE | 102009032962 A1 | 9/2010 |
| DE | 202011109461 U1 | 2/2012 |
| EP | 2790196 A1 | 10/2014 |
| FR | 417649 A | 11/1910 |
| JP | H06163964 A | 6/1994 |
| JP | 2000280988 A | 10/2000 |
| JP | 2001-278194 A | 10/2001 |
| JP | 2004182151 A | 7/2004 |
| RU | 2556134 C2 | 7/2015 |
| WO | 9933121 A1 | 7/1999 |
| WO | 2012152888 A2 | 11/2012 |
| WO | 2015050609 A2 | 4/2015 |

OTHER PUBLICATIONS

Androulakakis and Jusy, "Status and Plans of High Altitude Ariship (HAA™) Program", published on http://enu.kz/repository/2013/AIAA-2013-1362.

Sun et al.; "Membrane Material-Based Rigid Solar Array Design and Thermal Simulation for Stratopheric Airships". Hindawi Publishing Corporatoin; Advances in Materials Science and Engineering; vol. 2014, Article ID 192707, 7 pages.

Sun et al.; "Thermal Characteristics of Multilayer Insulation Materials for Flexible Thin-Film Solar Cell Array of Stratospheric Airship". Hindawi Publishing Corporatoin; Advances in Materials Science and Engineering; vol. 2014, Article ID 706308, 8 pages.

* cited by examiner

AIRSHIP CONSTRUCTION AND METHOD WHERE A HARNESS-STRUCTURE IS FASTENED AROUND A HULL

This application claims the benefit of U.S. Provisional Application No. 62/411,756 filed Oct. 24, 2016 and PCT/EP2017/077008 filed Oct. 23, 2017, International Publication No. WO 2018 077805 A1, which are hereby incorporated by reference in their entirety as if fully set forth herein.

FIELD OF THE INVENTION

The present invention relates to airships that are lighter than air, especially airships for the stratosphere.

BACKGROUND OF THE INVENTION

Recent development of light-weight and high-strength materials has promoted the interest in production of stratospheric airships. Especially, airships that are lighter-than-air for use in the stratosphere have increased attention for use as hubs in telecommunication and surveillance. However, the conditions in the stratosphere put some harsh requirements on the materials. Furthermore, long term use of the airships in the stratosphere requires that the energy is collected from solar light, which adds weight to the airship and thereby put some tight limits to the possible lifting weight as well as the weight of the airship itself relatively to the size of the airship. Increasing the size of the airship overcomes this problem, as the lifting force increases with the volume whereas the weight of the airship itself tends to increase with the surface area. However, large airships involve problems with respect to costs and practicability. The problem of providing a small stratospheric airship is still unresolved, in practice.

A general discussion on airships is found in the book "Airship Technology" by G. A. Khoury (Cambridge University Press 1999 with the second edition of 2012). Various experiments are going on for Stratospheric airships, for example in Aerostar International, a subsidiary of Raven Industries (http://ravenaerostar.com) and in collaboration with Southwest Research Institute and US Air Force Research Lab. Another active company is Near Space Corporation in Arizona (http://www.nsc.aero). The US Air Force ISIS project comprises a stratosphere airship with solar cells.

An overview of the Lockheed Martin High Altitude Airship program is given in the 2013 Internet publication "Status and Plans of High Altitude Airship (HAA™) Program" by Androulakakis and Jusy, published on http://enu.kz/repository/2013/AIAA-2013-1362.pdf.

With respect to construction of airships, there are various proposals. Whereas the large airships of the 20.sup.th century had an inner skeleton, the tendency is rather to avoid skeletons in order to save weight. As alternatives, flexible outer skeletons have been proposed, for example in US2006/192048, disclosing helical wound tensile bands forming an external light skeleton that is used for attaching power units, gondolas and tail units. The idea of straps around the hull for holding a gondola is very old and was already disclosed in FR417649 from 1910. In contrast to the flexible bands around the hull, U.S. Pat. No. 8,141,814 by Boeing discloses a rigid frame around a blimp for a double rotor used according to a helicopter principle with upward thrust.

However, there is still a need for improvements. Especially, there is a need a practical low-cost technical solution for small stratospheric airships.

DESCRIPTION/SUMMARY OF THE INVENTION

It is therefore an objective to provide improvements to airships, especially small stratospheric airships. This objective is achieved with an airship as explained in more details in the following.

The airship is of the kind that is filled with Helium or Hydrogen gas so that the airship is lighter than air. The gas-filled flexible hull forms a blimp that is elongate with a longitudinal axis and with a front part having a front end and a rear end at the tail. For example, the longitudinal axis is a symmetry axis, and the hull is rotational symmetric about that axis.

A harness-structure around the hull is used for carrying solar cells, batteries, propeller engines and electronics in order not to perturb the hull and thereby minimizing risks for leakage. Accordingly, the harness-structure does not extend through the hull material but is only abutting an outer side of the hull.

The harness-structure is made of a bendable material or comprises a bendable material as the main component of the structure, in order for the harness-structure to adjust flexibly to the shape of the hull, although not necessarily being stretchable.

In some embodiments, the harness-structure comprises a bendable ring-belt that is extending as a ring around the hull and around the longitudinal axis. The ring-belt is provided at a distance from the front end, for example corresponding to between 25% and 50% of the entire length of the hull, the length being measured along the longitudinal axis.

In some embodiment, the ring-belt is not stretchable in order to prevent elastic pressure on the hull and the gas volume inside, while in other embodiments, at least a part of the ring-belt is made resiliently stretchable in order to snugly fit onto the hull even when the hull is changing size. The different embodiments serve different purposes and depend on the desired conditions. For a stratospheric airship, the low temperature of the environment has to be taken into account when designing a resiliently stretchable harness, as elastic materials change properties when cooled down.

The harness structure, for example the ring-belt or the side-bands or both, is used for fastening and supporting at least one of: the propeller engine or multiple propeller engines, the batteries, the solar cells, for example provided on a panel, especially a flexible panel; and control modules for controlling the overall running of the system.

For example, the batteries are provided at a location that is on the underside of the hull when oriented in normal operation. For example, the control by the control modules includes the charging procedure, the functioning of the power supply and/or the running of the engine or engines as well as the steering.

Typically, two propeller engines are provided, one on either side of the hull. It is advantageous if the engines are provided close to the harness, for example at a distance from the hull of less than half or even less than a quarter of the diameter of the hull at the position of the engine. For example, the distance from the hull to the first propeller engine on one side of the hull is less than half or even less than a quarter of the distance from the first propeller to the second propeller on the other side of the hull. For example, the distance from the hull to the propeller is less than two times the propeller size.

Steering can be accomplished by directional adjustable tail fins or side fins. For light weight airships, however, the fins are optionally not adjustable but fixed in direction, making is possible to fasten it to the hull by gluing. Alternatively, the fins are attached to the harness-structure. In case that the fins are not adjustable, the propeller engines are advantageously adjustable in angle in order to direct the thrust slightly upwards or downwards while pulling forward.

Optionally, the harness-structure comprises bendable side-bands. For example, these are fastened to the ring-belt and extend along the outer side of the hull from the ring-belt to the tail of the hull, for example to the rear end. Typically, the side-bands are provided symmetrically on opposite sides of the hull. Optionally, the side bands are not stretchable in order to provide stability of the shape of the harness-structure. As the tail, especially the rear end, is narrower than a middle part of the hull, where the ring-belt is advantageously provided, a forward pull by propulsion units on the harness-structure would not slide off the hull but pull the tail along with the ring-belt.

In some embodiments, electrical conductors are integrated in a material of the harness-structure, for example side-bands or the ring-belt or both, for conducting electrical current. The electrical conductors are used for at least one of the following: between the solar cells and the batteries, between the batteries and the engines, between the solar cells and the engines.

It is an advantage if the solar cells, for example on a solar cell panel, the batteries, and the propeller engine or engines are electrically interconnected by electrical conductors that are integrated in the bendable material of the harness structure. Especially, in the case where the material of the harness-structure, for example including side-bands or the ring-belt or both, is a textile material comprising yarn, optionally woven or knitted. In this case, the electrical conductors are potentially provided as part of the material, for example, interwoven with the yarn or knitted or embroidered into the material. Alternatively, the conductors are printed or laminated onto the material of the harness structure, for example side-bands and/or ring-belt.

The electrical conductors can also be used for electronic signals between electronic components, especially control units. Optionally, the electrical conductors also comprise a digital databus for transmitting digital data signals between one or more control units and at least one of: the batteries, the solar cells, and the engine or engines.

For digital signals, optoelectronics can be used as an alternative to electrical conductors. For example, light guides for transmission of digital light signals can be integrated in the harness-structure, for example by interweaving flexible light guides into the harness textile material. Alternatively, the light guides are fastened to a surface of the harness-structure.

As it appears from the following, the various components are supported by the harness structure and are independent from the hull. The hull is not perturbed by these structures, minimizing the risk for leaks. Advantageously, the components are attached to the hull only by the harness-structure that surrounds the hull. This allows production of the harness structure with all the necessary components separately from the hull. For example, the entire harness-structure is provided, and the at least partially inflated hull is inserted into the harness structure as a final stage prior to launch of the airship. Alternatively, the harness structure is fastened around the hull after at least partial inflation.

Typically, the electrical conductors are flexible wires, and the fabrics of the harness-structure comprises contact locations at which there is an electrical connection between the wires and the batteries or solar cells or engines. For example, the wires are only locally extending out of the fabric at these contact locations.

Typically, the flexible wires are not stretchable. However wires can be meander-formed in order to provide stretchable conductors. In case the textile material is stretchable, especially more stretchable than the wires, options for structural match between the fabric material and the conductors include meander-formed wires that are used as stretchable conductors.

In some embodiments where a stretchable harness-structure is desired, the fabric includes elastomers to make the harness-structure resiliently stretchable.

As a further optional feature, the ring-belt is provided with a ring-belt tensioner cooperating with the ring-belt and configured for providing contractive tension to the ring-belt in a direction towards reduction of the length of the ring-belt. This feature yields an adjustable mechanism which minimizes the risk for the ring-belt to become lose from the hull. Such tensioner also makes it possible to adjust the diameter of the ring-belt in case of change in the hull size without the need of a stretchable material of the ring-belt itself. This feature is also useful for accommodating volume variations of the hull due to temperature changes of the gas during the day and night.

In a possible practical embodiment, the ring-belt tensioner comprises a first rigid arm fastened to a first location on the ring-belt, a second rigid arm fastened to a second location on the ring-belt, and a contracting resilient element connecting the first rigid arm to the second rigid arms and providing a resilient contraction force for pulling the first and the second location on the ring-belt towards each other.

In a concrete embodiment, the first and second rigid arms extend outward from the ring-belt and are mutually connected at an arm-connection remote from the ring-belt, such that the first and second location and the arm-connection form a triangle, and the contracting resilient element is provided inside this triangle.

Optionally, the engine is fastened to the first or second rigid arm or both, for example at the arm-connection.

Advantageously, the solar cells are not fastened to the surface of the hull material. Rather, the solar cells are only fastened to the harness-structure. For example, the solar cells are fastened to a base fabric, so as to form a flexible solar cell panel, which is fastened to the hull material but not fastened to the surface of the hull material. Optionally, the base fabric is fastened to a heat insulating layer, for example foam layer, between the base fabric and the hull for minimizing heat dissipation from the solar cells to the hull. Such triple structure is also, advantageously, fastened to and supported by the harness-structure, especially the ring-belt or the side-bands or both.

Typically, the harness-structure abuts the hull surface and encloses it at least partly but is not bonded to the surface material of the hull. Thus, no glue or other bonding material is used between the harness-structure and the hull surface, and the hull is not perturbed for any fastening of the harness-structure to the hull. Rather, the hull is inserted into the harness-structure, or the harness-structure is laid around the hull, and the harness structure is fixing the hull inside the harness-structure by the pressure between the outer hull surface and the inner surface of the harness-structure. This puts minimal stress on the hull material, which is desired thin and light-weight. It also implies that the hull can be easily removed from the harness-structure and replaced, keeping the harness structure as an integrated unit with power supply, power storage, engines and control units.

For example, the lighter than air airship is provided according to the following method. An elongate hull is provided with a longitudinal axis and the hull inflated with gas. Separately from the hull, a harness-structure is made of a bendable material. Only after inflating the hull, the harness structure is positioned around the hull, such that the harness-structure is abutting an outer side of the hull without perturbing the hull and without extending through the hull.

For example, prior to mounting of the harness-structure around the hull, the solar panel is secured to the harness structure. Also prior to such mounting, or alternatively after mounting, one or more propeller engines for forward thrust of the airship are secured to the harness-structure. Typically, two propeller engines are used, one on each of two opposite sides of the hull. Batteries, rechargeable by the solar cells of the solar panel, are also attached to the harness-structure for providing electrical power to the propeller engine or engines. Electrical conductors, advantageously integrated in the bendable material of the harness structure, are electrically interconnecting the solar cell panel, the batteries, and the propeller engine or engines.

In some concrete embodiments, the harness-structure has a bendable ring-belt comprising two opposite ends provided with belt fasteners. After inflation of the hull, the harness-structure is secured around the hull by interconnecting the two belt fasteners such that the ring-belt extends as a ring around the hull and around a longitudinal axis of the hull.

In order to avoid a difficult controllable buoyancy of the hull during mounting of the harness-structure, the hull is provided with a ballonet inside the hull for dividing the hull into at least two separate volumes of which at least one is for air and at least one for helium or hydrogen. The air volume, and optionally also the other volume for hydrogen or helium, is inflated prior to securing the harness-structure around the hull.

SHORT DESCRIPTION OF THE DRAWINGS

The invention will be explained in more detail with reference to the drawing, where FIGS. 1a and 1b illustrate a lighter-than-air airship with a harness structure and a) with hull and b) without hull;

DETAILED DESCRIPTION/PREFERRED EMBODIMENT

Figure 1A:
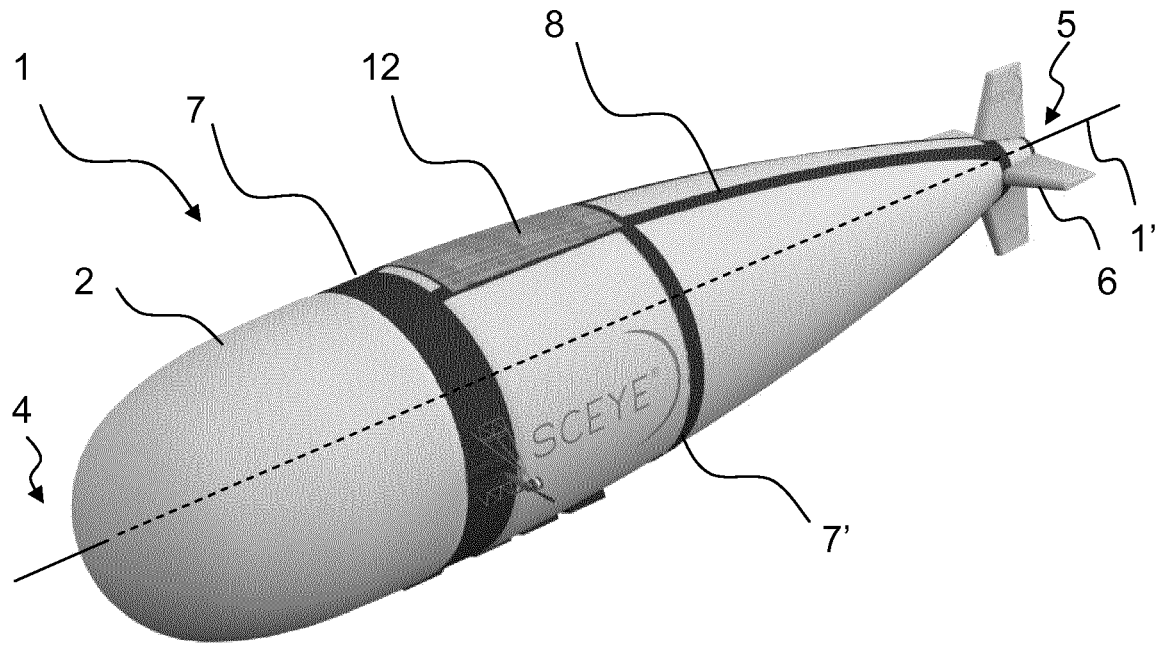

FIG. 1a illustrates a lighter-than-air airship 1. It comprises a flexible hull 2 forming a closed elongate blimp with a longitudinal axis 1'. The airship 1 has a front end 4 and a tail with fins 6 for stability, optionally also for steering, near or at a rear end 5 of the airship 1. The blimp contains gas, typically Helium or Hydrogen gas. If the hull material is flexibly bendable but not stretchable, it gives the hull a high degree of stability when inflated. A typical material for the hull 2 is a laminate of a reinforcing fibrous material in combination with gas-tight films. Various proposals exist as discussed in WO2014/009314, U.S. Pat. No. 7,713,890, or U.S. Pat. No. 6,074,722, among many others.

Figure 1B:
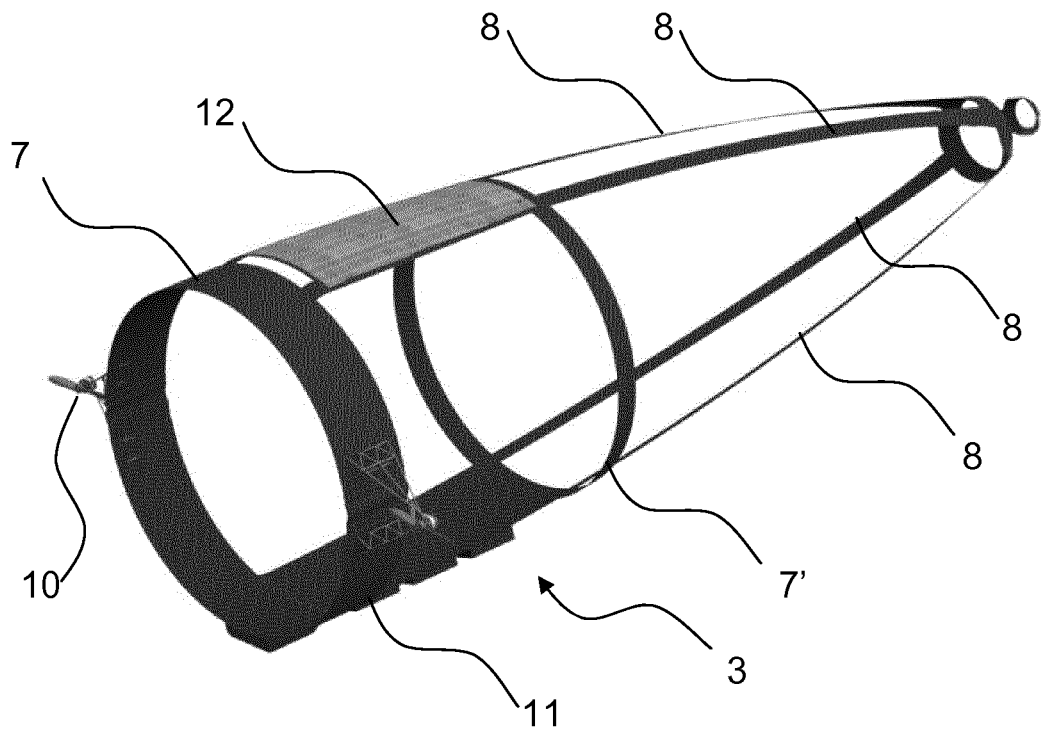

The hull 2 is partly enclosed by a harness-structure 3, better shown in isolation in FIG. 1B. The harness-structure 3 is abutting an outer side of the hull 2. The harness-structure 3 comprises a bendable ring-belt 7 extending as a ring around the hull 2 and the longitudinal axis 1'. Bendable side-bands 8 are fastened to the ring-belt 8 and extend along the outer side of the hull 2 from the ring-belt 7 to the rear end 5. These side-bands 8 are optional and are in some embodiments avoided. The harness-structure, optionally, also comprises one or more further ring-belts 7'.

Optionally, the ring-belt 7 and/or the sidebands 8 are not stretchable in order to prevent elastic pressure on the hull and the gas volume inside. Alternatively, the ring-belt 7 and/or the sidebands 8 are made resiliently stretchable in order to snugly fit onto the hull 2 even when the hull 2 is changing size, for example due to temperature changes of the gas. The different embodiments serve different purposes and depend on the desired conditions The airship 1 also comprises two electrical forward directed propellers 9 driven by an electrical propeller engine 10. The propeller engine 10 is driven by electrical current from rechargeable batteries 11 fastened to the harness-structure 3, for example at a lower location of the hull 2, so that the batteries which due to their weight promotes a certain orientation of the airship 1. On an opposite side of the hull 2, which during normal operation is upwards or at an upwards inclined position, the airship 1 comprises a solar cell panel 12 for charging the batteries 11 at daytime when sunlight falls on the solar cells 12' of the solar cell panel 12.

Figure 2A:
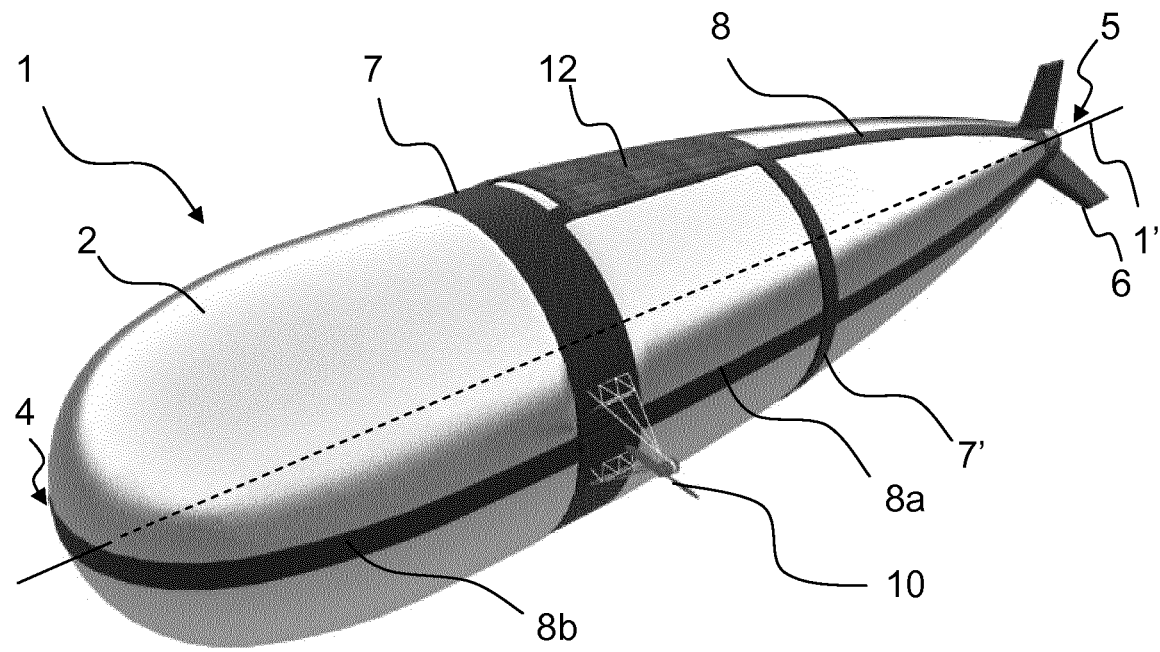
FIGS. 2a and 2b illustrate an alternative lighter-than-air airship with a harness structure and a) with hull and b) without hull.
Figure 2B:
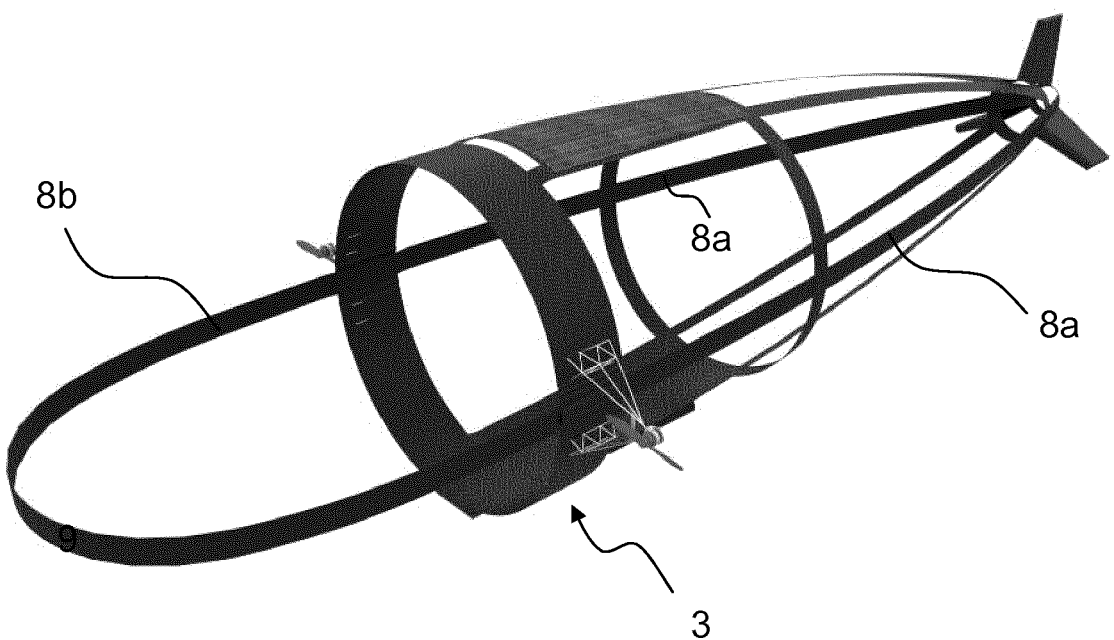

FIGS. 2a and 2b illustrate an alternative harness structure 3. The harness structure 3 comprises a further side-band 8a fastened to the ring-belt 7 and extending from a position on the ring-belt 7 at which also a propeller engine 10 is fastened. When the propeller engine 10 pulls forward, the further side-band 8a pulls the also the rear end 5 to minimize forces from the propeller engine 10 mounting, which would tend to deform the ring-belt 7. For further potential stability, optionally, there is also provided a front-band 8b extending from the ring-belt 7 and around front end 4. In case that the propeller engines 10 work rearwards, such front-band 8b secures the harness structure 3 from sliding off the hull 2.

Figure 7:
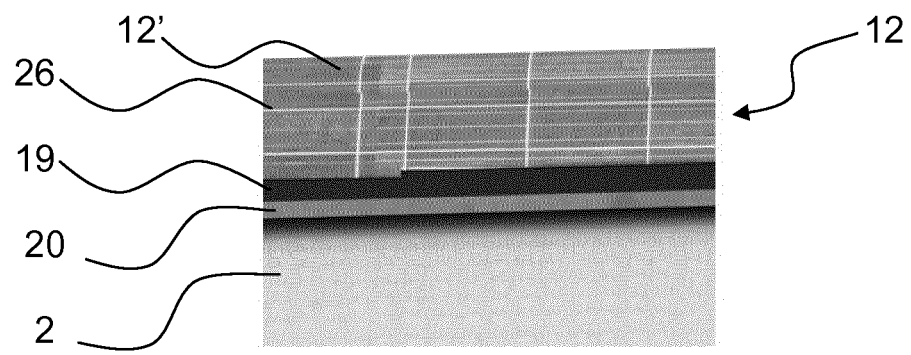
FIG. 7 is a schematic drawing of the solar cell panel.

In an optional embodiment, illustrated in FIG. 7, the solar cells 12' are fastened to a base fabric 19, which optionally is fastened to a heat insulating foam layer 20 between the base fabric 19 and the hull 2 for minimizing heat dissipation from the solar cells 12' to the hull 2. The solar cells 12' are electrically interconnected by panel-conductors 26 on the solar cell panel 12, for example solar cell wiring.

Figure 4:
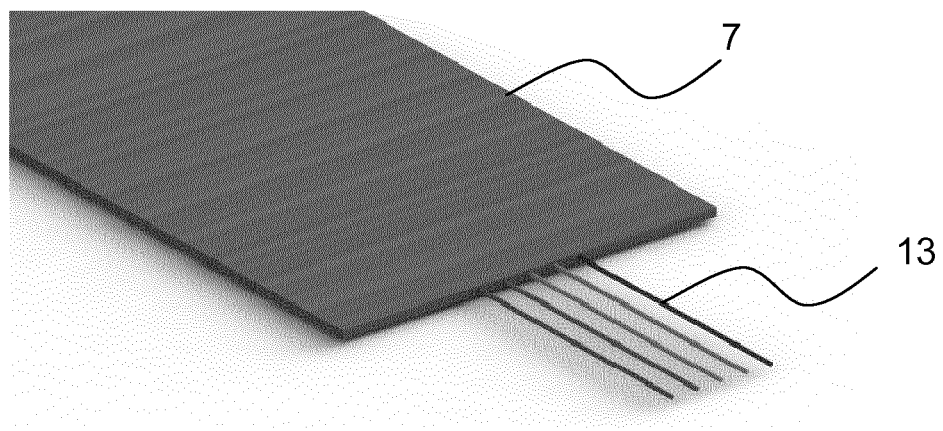
FIG. 4 is a schematic drawing of the harness-structure with integrated conductors.
Figure 5:
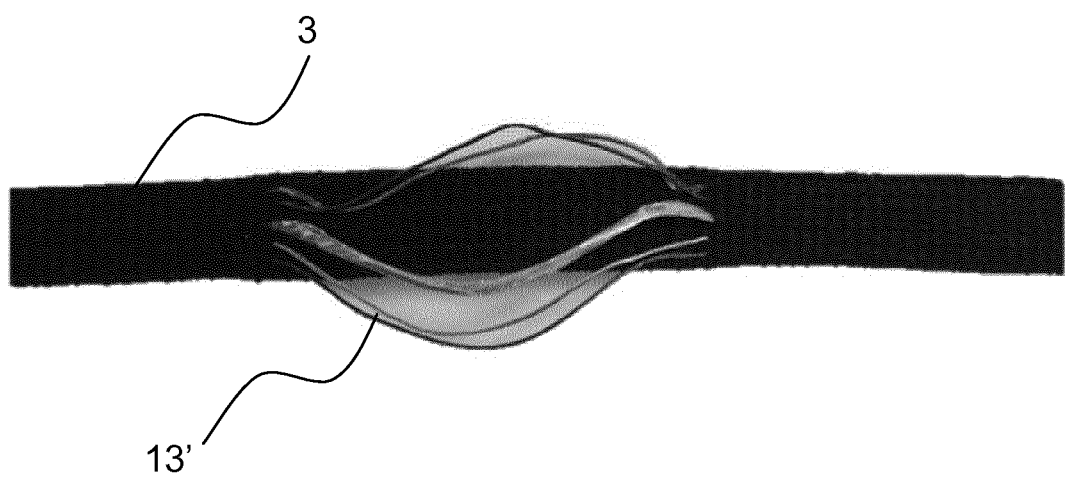
FIG. 5 shows an enlarged drawing of a harness ribbon.

The currents from the solar cells 12' to the batteries 11 and from the batteries 11 to the propeller engines 10, and optionally from the solar cells 12' directly to the propeller engines 10, are conducted through conductors 13 that are integrated in the harness-structure 3, for example in the ring-belt 7 material, as best illustrated schematically in FIG. 4. For example, the ring-belt 7 and potentially also the side-bands 8 are made from a woven or knitted material into which the conductors 13 are interwoven. An example of a woven ribbon with integrated, interwoven conducting flexible wires as conductors 13' is illustrated in FIG. 5.

Figure 6:
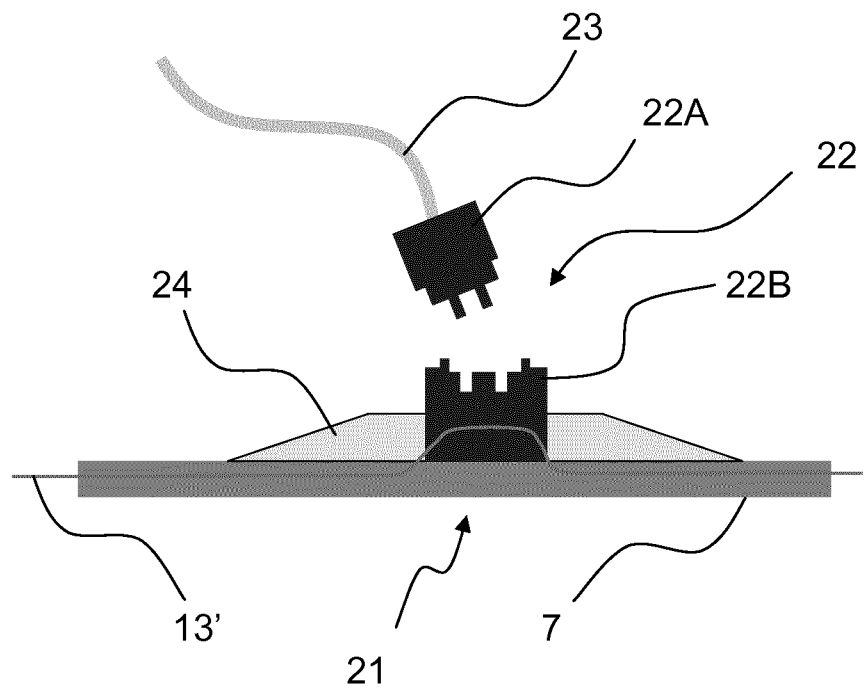
FIG. 6 shows sealed connectors.

Reference is made further to FIG. 6 in the following, which illustrates a further exemplary practical embodiment. At locations 21 where electrical contacts are required to the wires as conductors 13', sealed connectors 22 are provided, comprising a male part 22A with a cable 23 and a female part 22B for receiving the male part 22A. The female part 22B is electrically connected to the wire as conductor 13' and is sealed to the location 21 by a sealing material 24, typically a polymer resin. The male part 22A is forming an end of a cable 23, for example connected the solar cells 12', the batteries 11, or the propeller engines 10. Typically, such connection to the solar cells 12', the batteries 11, or the propeller engines 10 are connected to control units that ensure a proper functioning and coordinate the interplay of the various electrical and electronic components.

Alternatively to interweaving, the conductors are provided on top the material of the harness structure, for example by lamination or printing. This is also a way of integrating the conductors into the material of the harness, due to the conductors 13 becoming largely irremovable parts of the material by these techniques.

Figure 3:
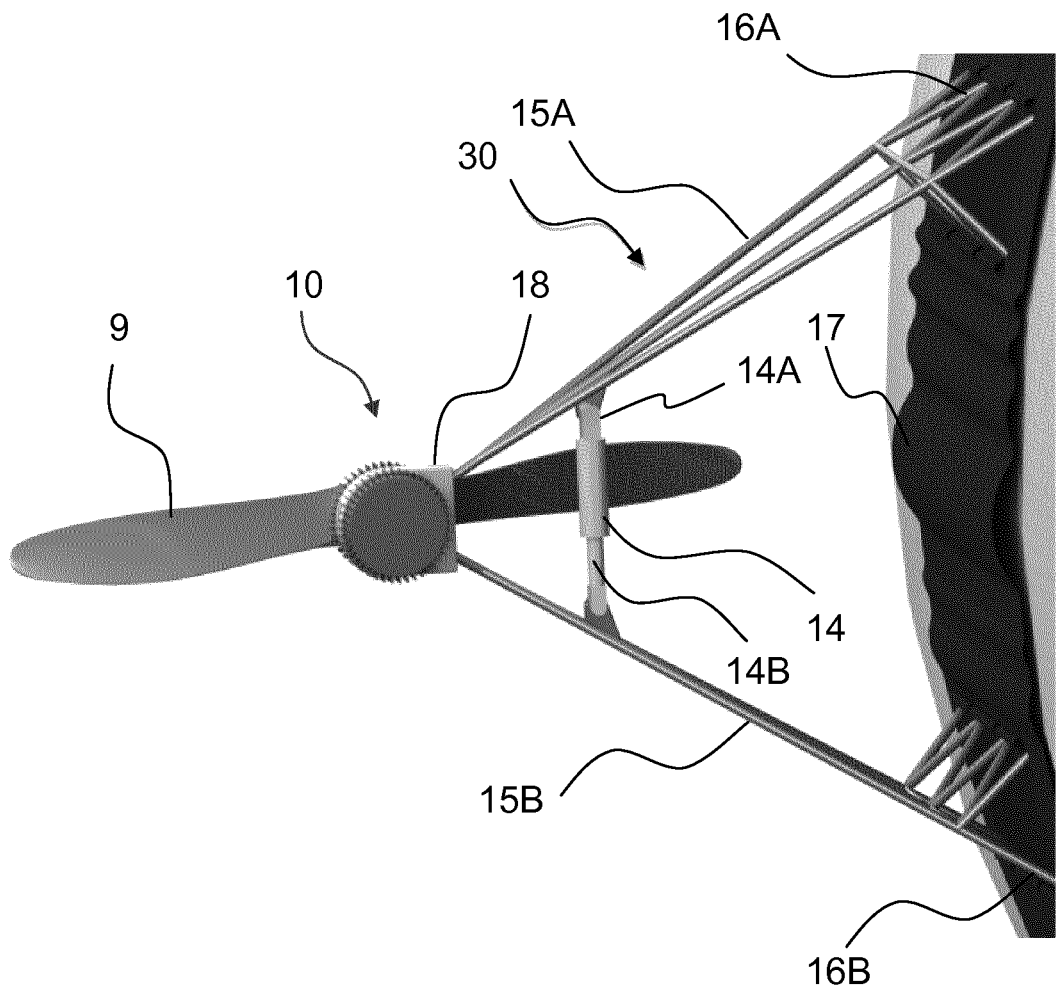
FIG. 3 shows the propeller and tensioner in greater detail

As illustrated in FIG. 3, the ring-belt 7 comprises a ring-belt tensioner 14 for contractive tension to the ring-belt 7. The force is such that is tends to decrease the length of the ring-belt, thus, holding the ring-belt 7 tight on the outer surface of the hull 2. Such ring-belt tensioner 14 is used to compensate for hull volume variations due to temperature shifts. The corresponding length variation is typically in the order of a few percent, for example less than 5% or less than 2%, of the length of the ring-belt.

The ring-belt tensioner 30 comprises a first rigid arm 15A fastened to a first location 16A on the ring-belt 7 and a second rigid arm 15B fastened to a second location 16B on the ring-belt 7. The first rigid arm 15A and the second rigid arm 15B are connected to a resilient contracting element 17 connecting the first rigid arm 15A to the second rigid arm 15B and providing a resilient contraction force for pulling the first location 16A and the second location 16B on the ring-belt 7 towards each other. As illustrated, the first rigid arm 15A and the second rigid arm 15B extend outward from the ring-belt 7 and are mutually connected at an arm-connection 18 remote from the ring-belt 7. The first location 16A and second location 16B and the arm-connection 18 form a triangle, wherein the contracting resilient element 14 is provided inside this triangle.

In the current illustration, the distance of the propeller engine 10 from the hull is in the order of the length of the propeller 9.

For example, the contracting resilient element 14 is a coiled spring (not shown) inside a sleeve 14A into which a rod 14B resiliently extends. The sleeve 14A and the rod 14B are connected to the first and the second arm 15A and 15B, respectively.

The harness structure 3 is an autonomous structure in the sense that it carries the entire electrical system without perturbing the hull 2 and without extending through the hull 2. For example, the harness structure 3 is provided as a complete entity which is a mounted onto the hull after inflation of the hull. An advantage is that the hull can be inflated freely without the risk for wrinkles between the hull material and the harness structure 3. Accordingly, the post-inflation attachment of the harness structure 3 to the hull 2 minimizes risk for damage to the hull 2 and minimizes the risk for creation of weak points in the hull 2 material.

Figure 8:
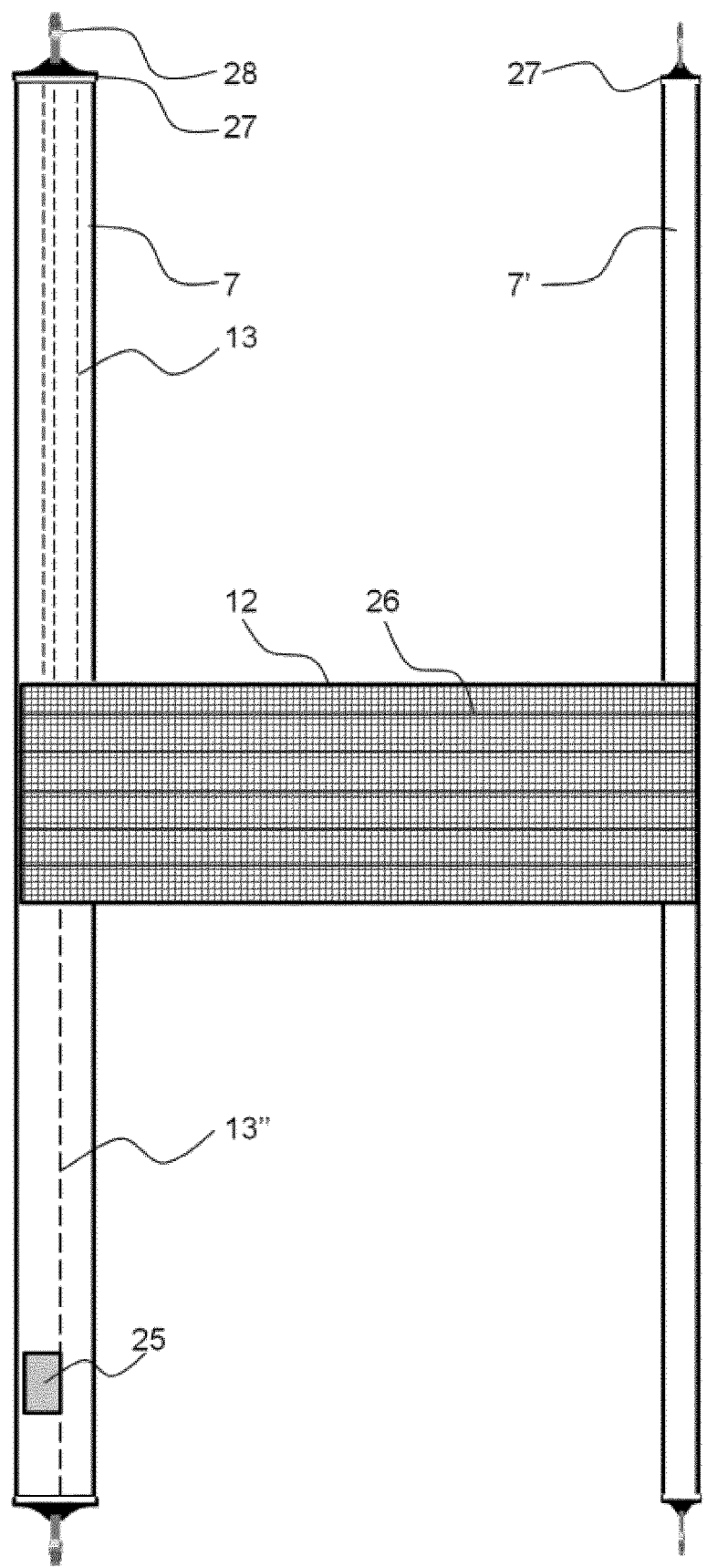
FIG. 8 illustrates a harness structure prior to mounting on the hull.

For example the harness-structure 3 is provided as a quasi-complete structure with a solar cell panel 12 and conductors 13 integrated in the harness material. An example is illustrated in FIG. 8. The harness-structure 3 of this embodiment comprises a ring-belt 7 and a further ring-belt 7' but no side bands. The two ring-belts 7, 7' have fastened in between them the solar panel 12 in which also electrically conducting panel-conductors 26 are integrated and optional electronic components 29, for example for measuring parameters, such as temperature and electrical load. The panel-conductors 26, for example solar cell wiring, for current that feeds the batteries and the propeller engines 10 are electrically connected to conductors 13 that are integrated in the ring-belt 7. The ring-belt 7 also carries a control unit 25 for electronic control of the propeller engines, the battery charging and discharging, and/or the solar cells 12' on the solar cell panel 12. For example the control unit 25 is electronically connected by conductors 13' to the electronic components 29 for receiving parameter values, such as performance measurements and temperature of the solar cells 12'. Optionally, the wire as conductor 13' for measurements is a digital databus. As a further option, also the further ring-belt 7' has conductors integrated in the harness material.

When the harness-structure 3 is fastened to the inflated hull 2, the ring-belt 7 and the further ring-belt 7' need to be closed as rings around the hull 2. This can be accomplished by belt fasteners 27 that are attached to ends of the ring-belts 7, 7' and which when combined close the ring-belt into a ring structure, for example by using interconnecting fastening straps 28. This principle is similar to fastening a saddle onto a horse, which is also expressed by the term of a "harness".

Optionally, the fastening straps 28 are resiliently stretchable in order to resiliently adjust the length of the ring-belt 7, especially during the rise of the airship 1 to high altitude, for example the stratosphere. Such resiliently stretchable fastening straps 28 can be used as an alternative or in addition to the belt tensioners 30.

The propeller engines 10 can be pre-fastened to the belt 7 prior to fastening of the harness-structure 3 to the inflated hull 2. Alternatively, the propeller engines 10 are fastened to the ring-belt 7 after fastening of the harness-structure 3 to the inflated hull 2. Optionally, also the batteries 11 are fastened to the harness structure 3 after mounting of the harness-structure 3 to the hull 2. Although, in principle the solar panel 12 can be attached to the ring-belts 7' 7' after fastening of the ring-belts 7, 7' around the inflated hull 2, it is in some embodiments preferred to provide the harness structure 3 with rings 7, 7' to which the solar panel 12 is already secured and electrically connected. This safeguards the correct distance between the rings 7, 7' during the fastening, and also facilitates the provision of electrical and electronic connections between the solar panel 12 and the ring-belt 7.

For example for a complete mounting procedure, the hull 2 is inflated fully, the harness structure 3 including the ring-belts 7, 7' and the solar panel 12 are fastened around to the hull 2, the propeller engines 10 and the batteries 11 are fastened to the ring-belt and electrically connected in subsequent steps as well as any additional payload. In principle, no further steps are necessary.

Examples of pay-load for the airship 1 are cameras, antennas, and transceivers, optionally for telecommunication and surveillance.

REFERENCE NUMBERS 1 airship
1' longitudinal axis of airship
2 flexible hull
3 harness-structure
4 front end of airship 1
5 rear end of airship 1
6 fins at rear end 5
7 ring-belt of harness-structure 3
7' optional further ring-belts 8 side-bands of harness-structure 3
8a further side-band extending from engine 9 position to rear end 5
8b front band extending from ring-belt 7 and around front end 4
9 propeller
10 propeller engine
11 batteries
12 solar cell panel
12' solar cells
13 conductors
13' wires as conductors
13" data bus
14 contracting resilient element
14A sleeve of contracting resilient element
14B rod resiliently extending into sleeve 14A
15A first rigid arm fastened to first location 16A
15B second rigid arm fastened to second location 16B
16A first location on ring-belt 7
16B second location on ring-belt 7
17 resilient contracting element connecting the first rigid arm 15A to the second rigid arm 15B
19 base fabric to which solar cells are fastened
20 insulating foam to which the base fabric 19 is fastened
21 locations for electrical contact to the conductors 13/wires 13*
22 connector
22A male part of connector 22
22B female part of connector 22
23 cable at male part
24 sealing material at location 21
25 controller
26 panel conductors, for example solar cell wiring
27 belt fastener
28 strap attached to belt fastener 27
29 electronic components for parameter measurements on solar cell panel 12
30 ring-belt tensioner

The invention claimed is:

1. A lighter than air airship (1) comprising a gas-filled flexible hull (2) which is elongate with a longitudinal axis (1') and with a front end (4) and a rear end (5), wherein a harness-structure (3) is abutting an outer side of the hull (2) without perturbing the hull (2) and without extending through the hull (2); wherein the harness structure (3) is made of a bendable material and carries a propeller engine (10) for forward thrust of the airship (1), rechargeable batteries (11) for providing electrical power to the propeller engine (10), and a solar cell panel for providing electrical power to recharge the batteries (11);
   wherein the solar cell panel (12), the batteries (11), the propeller engine (10) are electrically interconnected by electrical conductors (13) that are integrated in the bendable material of the harness structure (3);
   wherein the harness-structure (3) comprises a bendable ring-belt (7) extending as a ring around the hull (2) and around the longitudinal axis (1') and carrying the solar cell panel (12);
   wherein the ring-belt (7) is made of a ring-belt material into which the electrical conductors (13) are integrated, wherein the electrical conductors are electrically interconnecting the solar cell panel (12) and the batteries (11); and
   wherein the harness structure (3) comprises a further ring-belt (7') at a distance to the ring-belt (7), wherein the solar cell panel (12) extends from the ring-belt (7) to the further ring-belt (7') and is fastened to both ring-belts (7, 7').

2. A lighter than air airship (1) comprising a gas-filled flexible hull (2) which is elongate with a longitudinal axis (1') and with a front end (4) and a rear end (5), wherein a harness-structure (3) is abutting an outer side of the hull (2) without perturbing the hull (2) and without extending through the hull (2); wherein the harness structure (3) is made of a bendable material and carries a propeller engine (10) for forward thrust of the airship (1), rechargeable batteries (11) for providing electrical power to the propeller engine (10), and a solar cell panel for providing electrical power to recharge the batteries (11); wherein the solar cell panel (12), the batteries (11), the propeller engine (10) are electrically interconnected by electrical conductors (13) that are integrated in the bendable material of the harness structure (3); wherein the harness-structure (3) comprises a bendable ring-belt (7) made of a ring-belt material extending as a ring around the hull (2) and around the longitudinal axis (1') and carrying the solar cell panel (12); wherein the ring-belt (7) is provided with a ring-belt tensioner (30) configured for automatically and resiliently providing contractive tension to the ring-belt material in a direction towards reduction of the length of the ring-belt (7) for accommodating volume variations of the hull (2); and wherein the ring-belt tensioner (30) comprises a first rigid arm (15A) fastened to a first location (16A) on the ring-belt (7), a second rigid arm (15B) fastened to a second location (16B) on the ring-belt (7), and a contracting resilient element (14) connecting the first rigid arm (15A) to the second rigid arms (15B) and providing a resilient contraction force for pulling the first location (16A) and the second location (16B) on the ring-belt (7) towards each other.

3. The airship according to claim 2, wherein the propeller engine (10) is fastened to the first rigid arm (15A) or second rigid arm (15B) or both.

4. The airship according to claim 3, wherein the propeller engine (10) is fastened to the first and second rigid arms (15A, 15B) at the arm-connection (18).

5. A lighter than air airship (1) comprising a gas-filled flexible hull (2) which is elongate with a longitudinal axis (1') and with a front end (4) and a rear end (5), wherein a harness-structure (3) is abutting an outer side of the hull (2) without perturbing the hull (2) and without extending through the hull (2); wherein the harness structure (3) is made of a bendable material and carries a propeller engine (10) for forward thrust of the airship (1), rechargeable batteries (11) for providing, electrical power to the propeller engine (10), and a solar cell panel for providing electrical power to recharge the batteries (11); wherein the solar cell panel (12), the batteries (11), the propeller engine (10) are electrically interconnected by electrical conductors (13) that are integrated in the bendable material of the harness structure (3), wherein the harness-structure (3) comprises a bendable ring-belt (7) made of a ring-belt material extending as a ring around the hull (2) and around the longitudinal axis (1') and carrying the solar cell panel (12); wherein the ring-belt (7) is provided with a ring-belt tensioner (30) configured for automatically and resiliently providing contractive tension to the ring-belt material in a direction towards reduction of the length of the ring-belt (7) for accommodating volume variations of the hull (2); and wherein a first rigid arm (15A) fastened to a first location (16A) on the ring-belt (7) and a second rigid arm (15B) fastened to a second location (16B) on the ring-belt (7) extend outward from the ring-belt (7) and are mutually connected at an arm-connection (18) remote from the ring-belt (7), such that the first and second locations (16A, 16B) and the arm-connection (18) form a triangle, wherein a contracting resilient element (14) is provided inside this triangle.

6. A method for producing a lighter than air airship, the method comprising, providing an elongate hull with a longitudinal axis (1') and inflating the hull with gas; providing a harness-structure (3) made of a bendable material; securing the harness-structure (3) around the hull after inflating the hull, such that the harness-structure (3) is abutting an outer side of the hull (2) without perturbing the hull (2) and without extending through the hull (2); securing a propeller engine (10) for forward thrust of the airship (1), rechargeable batteries (11) for providing electrical power to the propeller engine (10), and a solar cell panel for providing electrical power to recharge the batteries (11) to the harness structure (3), wherein the method comprises providing the harness structure (3) with the solar panel secured to the harness structure (3) prior to securing the harness-structure (3) around the hull.

7. The method according to claim 6, wherein the method comprises providing the harness-structure (3) with a bendable ring-belt (7), the ring-belt (7) comprising two opposite ends provided with belt fasteners (27), and after inflation of the hull, securing the harness-structure (3) around the hull by interconnecting the two belt fasteners such that the ring-belt (7) extends as a ring around the hull (2) and around a longitudinal axis (1') of the hull.

\* \* \* \* \*